June 6, 1967 D. S. HUNTER 3,323,364
MEANS FOR REJECTING QUADRATURE VOLTAGE
SIGNALS IN A FLOW METER
Filed Jan. 21, 1965
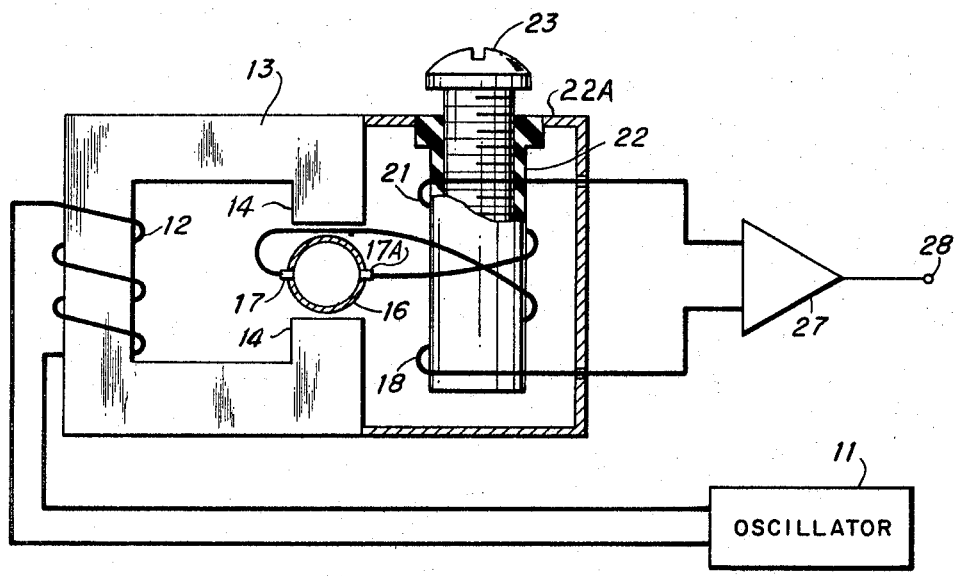
INVENTOR.
DONALD S. HUNTER
BY
Richard K. Macneill

United States Patent Office 3,323,364
Patented June 6, 1967

3,323,364
**MEANS FOR REJECTING QUADRATURE VOLT-
AGE SIGNALS IN A FLOW METER**
Donald S. Hunter, 3952 Antiem St.,
San Diego, Calif. 92111
Filed Jan. 21, 1965, Ser. No. 426,895
3 Claims. (Cl. 73—194)

The present invention relates to magnetic induction flow meters of a type in which flow is measured by observing the voltage induced across a flow tube in the presence of a magnetic field and, more particularly, to a method and means for rejecting quadrature or no-flow signals in magnetic induction flow meters.

Prior art methods of canceling the no-flow quadrature voltage in magnetic induction flow meters are generally of three types. The first method attempts to apply a voltage of opposite polarity, i.e., in anti-phase, with the quadrature voltage, and adjusting the amplitude for cancellation. The difficulty here is that, in order to obtain a true cancellation, the anti-phase voltage must have the same waveform, amplitude and phase. Since the quadrature voltage from coreless and core type sensors differ in phase, this method is impractical from a commercial point of view. Also, in order to cancel the quadrature voltage, the fluid flow must be stopped, which is a condition which cannot be met in many physiological flow measurements, i.e., the cancellation adjustment could not be made in situ in many instances.

A second method of adjusting or cancelling quadrature voltage is to adjust the physical positions of the sensor leads such that an equal and opposite voltage is induced in the lead, so as to obtain a zero or near-zero quadrature voltage. In this method, the leads are affixed in a canceling position with some material which becomes rigid upon setting or curing. The major disadvantage with this method is that the adjusting cannot be accomplished in situ, and that as the affixing plastic cures, the quadrature setting will change. In addition, as the material ages, the quadrature setting changes.

A third method, similar to the second, is based on holding all of the critical sensor parameters, such as the core, coil, lumen and electrodes within very close manufacturing tolerances. The signal leads are then physically positioned, again in a manner that zero on near-zero quadrature is obtained by cancellation. Again, the leads cannot be moved after installation, and accuracy will deteriorate with aging. A further disadvantage of this third method lies in the extremely high manufacturing costs, due to the required close tolerances.

According to the invention, the signal leads from the electrode sensors are looped around a non-ferrous cylinder which is threaded internally and then adjusted in such a manner as to obtain a zero or near-zero quadrature voltage, much the same as the second method listed above. Epoxy is placed around the signal leads and cylinder, so as to hold the assembly firmly in this desired position. A ferrous screw is then threadably engaged within the cylinder, and adjusted to produce a zero or near-zero quadrature voltage. This is achieved by the shaping of the magnetic field about the signal wires by the adjustable core, which is the ferrous screw. This has the added advantage in that the quadrature may be set on either side of zero, i.e., a plus or minus 90° with respect to the signal voltage. The entire assembly is then encapsulated, leaving the screw adjustment open. Hence, the sensor may be placed in the actual working environment, and the instrument adjusted in situ to obtain a quadrature voltage.

An object of the present invention is the provision of an improved flow meter of the character indicated.

Another object is to provide an improved flow meter with means for rejecting signals out of phase with the desired flow induced signal.

A further object of the invention is the provision of means for the substantial elimination of the no-flow signal observed in flow meters excited with an alternating field.

Still another object is to provide improved means for increasing the flow signal to quadrature signal ratio, and thereby extending the lower limit of operation in flow meters of the character described.

Yet another object is the provision of an improved flow meter which is basically simple, inexpensive, and requires a minimum of maintenance and calibration.

Other objects and many of the attendant advantages of this invention will be readily appreciated as the same becomes better understood by reference to the following detailed description, when considered in connection with the accompanying drawing in which the sole figure is a schematic diagram of the preferred embodiment of the present invention.

Referring to the drawing, oscillator 11 is coupled to winding 12 on laminated core 13. Laminated core 13 terminates in pole pieces 14. Flow tube 16 is mounted between and carried by pole pieces 14. Pickup probes 17 and 17A are mounted in flow tube 16 opposite one another. Probe 17 is electrically coupled to differential amplifier 27 via magnetic loop 18, and probe 17A is coupled to differential amplifier 27 via magnetic loop 21. Loops 18 and 21 are carried by non-ferrous cylinder 22 which is fixedly attached to a non-ferrous housing or frame 22A. Cylinder 22 has a threaded bore therein, and threaded steel screw 23 is threadably engaged therewith. The output of differential amplifier 27 is coupled to output terminal 28.

Operation

With no flow in tube 16, a signal is picked up at probes 17 and 17A, resulting from the flux induced in core 13 from oscillator 11. This signal is in quadrature, or 90° removed, from a flow signal picked up by probe 17 and 17A, but is much higher in amplitude. Hence, it becomes necessary to remove this quadrature or no-flow voltage prior to the input of differential amplifier 27, in order that accurate readings of signals resulting from the flow of a fluid in tube 16 may be seen at output terminal 28. This is accomplished by taking each signal lead from probes 17 and 17A, respectively, and wrapping them in opposite directions around cylinder 22 (preferably crossing the leads as shown). Hence, stray magnetic flux from core 13, which is in phase with the quadrature or no-flow voltage, will induce a voltage in one loop which is in-phase with the undesired signal, and induce a voltage in the other loop which is in anti-phase with the undesired signal. In this embodiment, loop 21 is wrapped in a direction to produce the anti-phase of the undesired signal, and loop 18 in a direction to produce the in-phase voltage with the undesired signal. Steel or ferrous screw 23 is then adjusted until the total anti-phase field produces an anti-phase voltage which equals the total in-phase voltage produced, and thus cancellation of the quadrature or no-flow signal at the input of differential amplifier 27. It is pointed out that the windings or loops 18 and 21 are schematic, and in actual practice, can represent a partial loop or more than one turn.

It should be understood, of course, that the foregoing disclosure relates to only a preferred embodiment of the invention, and that it is intended to cover all changes and modifications of the example of the invention herein chosen for the purposes of the disclosure, which do not constitute departures from the spirit and scope of the invention.

I claim:
1. A flow meter comprising:
(a) a flow tube;
(b) first and second spaced electrodes mounted in said flow tube at a probing section;
(c) magnetic excitation means having a gap at said probing section;
(d) first and second signal leads connected to said first and second spaced electrodes;
(e) said first and second signal leads being within the magnetic field of said magnetic excitation means; and
(f) first and second magnetic loops in said first and second leads respectively; and
(g) an adjustable magnetic member being carried within said first and second loops for effecting cancellation of any no-flow voltage picked up by said first and second-spaced electrodes.

2. The flow meter of claim 1 wherein said first and second loops are wound in opposite directions.

3. The flow meter of claim 2 wherein said first and second loops physically cross.

References Cited
UNITED STATES PATENTS

| | | | |
|---|---|---|---|
| 2,696,737 | 12/1954 | Mittelmann | 73—194 |
| 2,929,247 | 3/1960 | Sturgeon | 73—194 |

FOREIGN PATENTS

| | | |
|---|---|---|
| 834,011 | 5/1960 | Great Britain. |

RICHARD C. QUEISSER, *Primary Examiner.*

C. A. RUEHL, *Assistant Examiner.*